United States Patent

Degen et al.

Patent Number: 5,702,616
Date of Patent: Dec. 30, 1997

[54] ARAMID FIBER FILTRATION SHEET

[75] Inventors: Peter J. Degen, Huntington; Warren M. Foss, Glen Cove, both of N.Y.

[73] Assignee: Pall Corporation, East Hills, N.Y.

[21] Appl. No.: 638,958

[22] Filed: Apr. 24, 1996

Related U.S. Application Data

[62] Division of Ser. No. 236,515, Apr. 29, 1994, Pat. No. 5,529,844.

[51] Int. Cl.⁶ .......................... B01D 39/08; B01D 27/06; D02G 3/00
[52] U.S. Cl. .............. 210/767; 210/321.86; 210/321.87; 210/489; 210/497.01; 210/493.2; 428/338; 428/357; 428/395
[58] Field of Search ...................... 210/767, 321.86, 210/321.87, 488, 489, 497.01, 497.1, 497.2, 493.1, 493.2; 428/357, 395, 338

[56] References Cited

U.S. PATENT DOCUMENTS

| | | |
|---|---|---|
| 3,242,035 | 3/1966 | White . |
| 3,756,908 | 9/1973 | Gross . |
| 4,340,479 | 7/1982 | Pall . |
| 4,369,156 | 1/1983 | Mathes et al. . |
| 4,523,995 | 6/1985 | Pall et al. . |
| 4,524,103 | 6/1985 | Seager . |
| 4,650,506 | 3/1987 | Barris et al. . |
| 5,246,776 | 9/1993 | Meraldi et al. . |
| 5,290,446 | 3/1994 | Degen et al. . |

FOREIGN PATENT DOCUMENTS

| | | |
|---|---|---|
| 0 083 489 | 7/1983 | European Pat. Off. . |
| 0 109 169 | 5/1984 | European Pat. Off. . |
| 0 402 866 | 12/1990 | European Pat. Off. . |
| 0 475 708 | 3/1992 | European Pat. Off. . |
| 891945 | 3/1962 | United Kingdom . |

OTHER PUBLICATIONS

"The Kady Mill" Brochure (Kinetic Dispersion Corp., Scarborough, Maine) (date unknown).
"HTD28 Homogenizer" Brochure (Union Pump Company, North Andover, Massachusetts) (date unknown).
"M-110Y High Pressure Microfluidizer® Processor" Technical Bulletin (Microfluidics International Corporation, Newton, Massachusetts) (date unknown).
"M-110E Electric-Hydraulic Laboratory Microfluidizer® " (Microfluidics International Corporation, Newton, Massachusetts) (date unknown).
"Microfluidizer® Processing Equipment" Product Catalog (Microfluidics International Corporation, Newton, Massachusetts) (date unknown).
ASTM F316-86 (Apr. 1986).

*Primary Examiner*—W. L. Walker
*Attorney, Agent, or Firm*—Leydig, Voit & Mayer, Ltd.

[57] ABSTRACT

The present invention provides a polymeric, particularly aramid, fiber filtration sheet having a relatively small pore size and high pore uniformity. The present inventive aramid fiber filtration sheet preferably has a titer reduction against bacteria such as *Pseudomonas diminuta*. The present invention also provides a method of preparing reduced-diameter aramid fibers, as well as a method of preparing an aramid fiber filtration sheet from such reduced-diameter aramid fibers. The present invention further provides a method of treating a fluid by passing a fluid through the present inventive aramid fiber filtration sheet, as well as a filter element incorporating the present inventive aramid fiber filtration sheet.

68 Claims, 5 Drawing Sheets

5,702,616

ARAMID FIBER FILTRATION SHEET

This is a divisional of application Ser. No. 08/236,515, filed on Apr. 29, 1994, which is now U.S. Pat. No. 5,529,844.

TECHNICAL FIELD OF THE INVENTION

The present invention pertains to fibrous filtration sheets. In particular, the present invention relates to a polymeric fiber sheet, especially an aramid fiber sheet, as well as a method of preparing and using such a sheet, particularly as a filtration medium.

BACKGROUND OF THE INVENTION

Numerous fibrous filtration sheets have been prepared from a variety of fibers, such as glass, polyethylene, polypropylene, polyester, and aramid fibers. While these sheets are suitable for many applications, particularly many filtration applications, they are generally incapable of reliably removing small micron and submicron particulate matter and bacteria. While the thickness of such a fibrous sheet can be increased to compensate for the relatively large pore size of the sheet, the flow resistance of the sheet then becomes impractically high. This inability to prepare fibrous filtration sheets of sufficiently small pore size is generally the result of the unavailability of fibers of sufficiently fine diameter inasmuch as the pore size of a fibrous filtration sheet is related to some extent to the fiber diameter used to prepare such a sheet, i.e., uniformly smaller diameter fibers will more easily allow for the preparation of a fibrous filtration sheet of uniformly smaller pore size.

While many organic fibers, such as polyethylene and polypropylene, are available as staple cut fibers with diameters above about 8 microns, glass fibers are available with diameters of about 0.25–4 microns. Thus, glass fibers have generally been the material of choice in constructing fibrous filtration sheets of the finest pore sizes, albeit of insufficiently small pore size to remove very small particulate matter and bacteria.

While glass fibrous sheets are capable of providing the desirable smaller pore size as compared to polymeric fibrous sheets, glass fibrous sheets suffer from many performance disadvantages as compared to polymeric fibrous sheets. For example, glass fibrous sheets are relatively brittle and require extreme care in handling. As a result, glass fibrous sheets are difficult to convert into corrugated structures for filter elements without introducing cracks in the sheets, particularly in preparing small radii filter elements, with the consequent loss of filtration efficiency. The brittleness of glass fibrous sheets also render such sheets susceptible to failure upon pulsing of the fluid flow through the sheets. In addition, glass fibrous sheets are subject to significant chemical and thermal reactivity. For example, since glass is subject to degradation in alkaline environments, glass fibrous sheets are not well-suited for such environments. Moreover, glass fibrous sheets must be prepared using a resin binder, which is subject to chemical degradation, can adversely affect performance, and provides a potential source of contamination through leaching.

Accordingly, there remains a need for a fibrous filtration sheet with a relatively small pore size, preferably sufficiently small to remove submicron particles, especially bacteria, at a reasonable flow resistance through the fibrous sheet. Such a fibrous filtration sheet preferably would also have a high modulus, as well as sufficient elongation, so as to withstand filtration conditions, such as pulsing, which can be encountered in commercial filtration processes. The handling characteristics of such a fibrous filtration sheet should also be such that the sheet can be converted into a corrugated structure for a filter element without damaging the sheet in any way so as to affect filtration efficiency. A high temperature resistance and good chemical stability are other useful and desirable characteristics of such a fibrous filtration sheet.

The present invention provides such a fibrous filtration sheet, as well as a method of preparing and using such a fibrous filtration sheet, particularly in filtration applications. These and other objects and advantages of the present invention, as well as additional inventive features, will be apparent from the description of the invention provided herein.

BRIEF SUMMARY OF THE INVENTION

The present invention provides an aramid fiber filtration sheet having a first bubble point of at least about 50 in. water column and preferably a 1500 cc/min bubble point of at least about 100 in. water column. The aramid fiber filtration sheet desirably has a ratio of 1500 cc/min bubble point to first bubble point of about 2 or less. Both the first and 1500 cc/min bubble points are an indication of the pore size of a sheet, and their ratio reflects the desirable uniformity of the pores and the narrow pore size distribution of the sheet. The present inventive aramid fiber filtration sheet can be prepared so as to have a consistent and predictable titer reduction. Thus, the present inventive aramid fiber filtration sheet is capable of providing the range of desirable titer reductions in a controlled manner. The present inventive aramid fiber filtration sheet can be characterized by desirably having a titer reduction of at least about $10^5$, and preferably at least about $10^8$ or even $10^{10}$, against Pseudomonas diminuta. Accordingly, the present inventive aramid fiber filtration sheet can be prepared so as to be capable of removing all bacteria from a fluid.

The present invention also provides a method of preparing the aramid fibers which are useful in the construction of the present inventive aramid fiber filtration sheet. Specifically, the present invention includes a method of reducing the diameter of aramid fibers comprising preparing a dispersion of aramid fibers in a fluid and subjecting the dispersion to mechanical fibrillation under conditions sufficient to reduce the average diameter of the aramid fibers. The present invention also includes a method of preparing an aramid fiber filtration sheet comprising reducing the diameter of aramid fibers as described herein and preparing an aramid fiber filtration sheet from the reduced-diameter aramid fibers, as well as a filter element prepared from such an aramid fiber filtration sheet. The present invention further provides a method of treating a fluid by passing a fluid through the present inventive aramid fiber filtration sheet.

DESCRIPTION OF THE PREFERRED EMBODIMENTS

Figure 1:
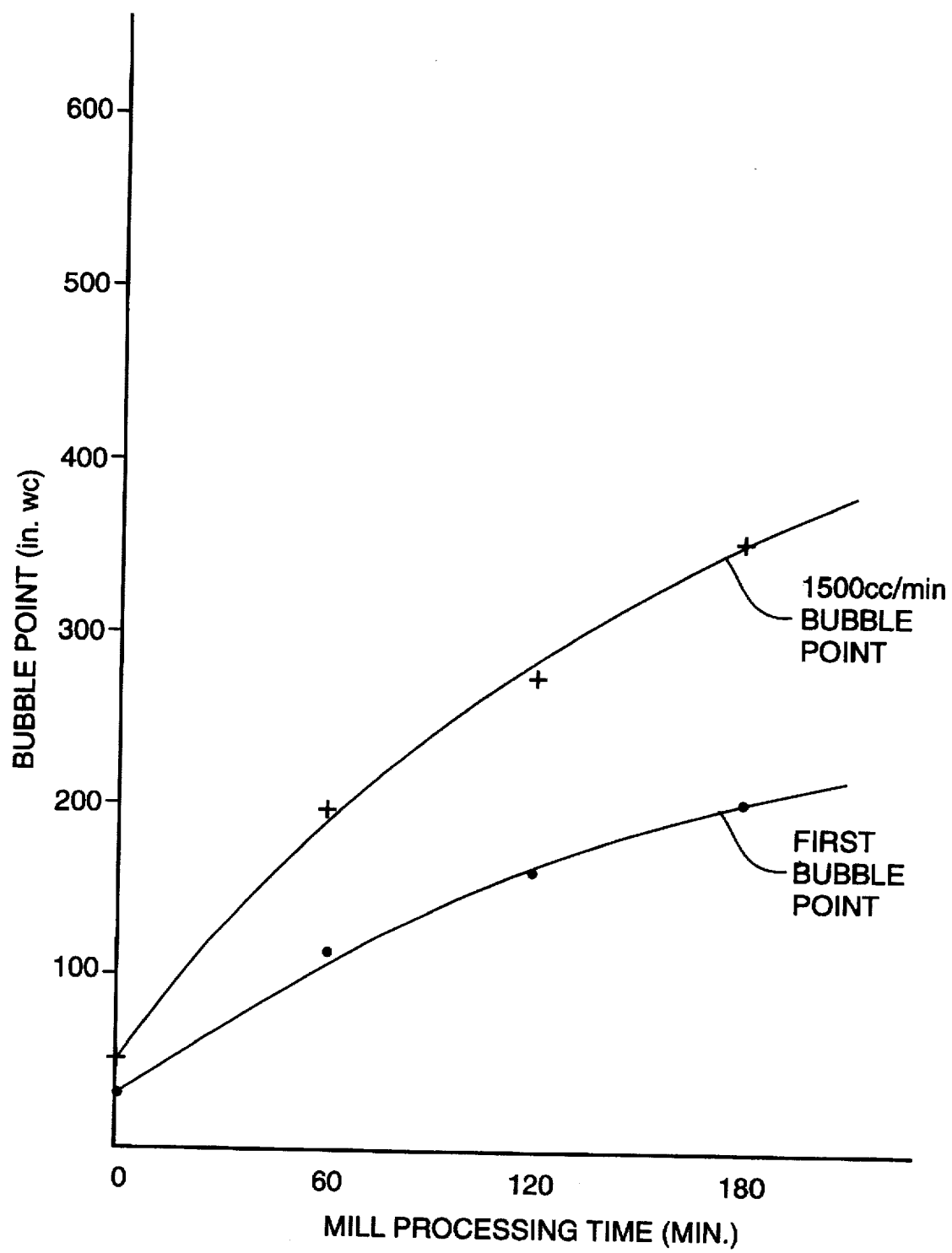
FIG. 1 is a graph depicting curves showing the relationship between the rotor-stator mill residence time (min) used to prepare the aramid fibers of an aramid fiber filtration sheet and the resulting first and 1500 cc/min bubble points (in. water column) of the aramid fiber filtration sheet.

The present invention provides an aramid fiber filtration sheet with the advantages of both glass fibrous sheets and polymeric fibrous sheets and with few of the disadvantages of either of those sheets.

The finest fibrous filtration sheets are prepared from submicron diameter glass fibers. These glass fibrous sheets have the advantage of small pore size but suffer from the disadvantage of being brittle and possess a variety of other handling and performance disadvantages as discussed above. The finest polymeric fibrous filtration sheets are melt-blown with fibers of several microns in diameter, and, while such polymeric fibrous sheets have better handling characteristics than glass fibrous sheets, such polymeric fibrous sheets heretofore have suffered the disadvantages of having a relatively large pore size (generally due to the relatively large diameter of the fibers) and relatively low filtration efficiency. The present invention provides a polymeric fibrous filtration sheet, particularly an aramid fiber filtration sheet, with a pore size at least as small as that of the finest glass fibrous sheets while substantially retaining the benefits of polymeric fibrous sheets. The present inventive aramid fiber filtration sheet can have a low flow resistance and low sheet weight and be quite thin, while still exhibiting a heretofore unknown filtration efficiency and bubble point in such a fibrous filtration sheet in a consistent and predictable manner.

In particular, the present invention provides an aramid fiber filtration sheet having a first bubble point of at least about 50 in. water column, preferably at least about 100 in. water column, and more preferably at least about 150 or even 200 in. water column.

The present inventive aramid fiber filtration sheet desirably has a ratio of 1500 cc/min bubble point to first bubble point of about 2 or less, preferably about 1.6 or less. Both the first and 1500 cc/min bubble points are an indication of the pore size of a sheet, and their ratio reflects the uniformity of the pores and the narrowness of the pore size distribution of the sheet.

Bubble point measurements can be carried out as described in ASTM F316-86, with the first bubble point being the applied pressure resulting in the formation of the first bubble through the sheet which is alcohol wet, and the 1500 cc/min bubble point being the applied pressure resulting in the passage of 1500 cc/min of air through the sheet which is alcohol wet, i.e., general air flow through the sheet indicating the expulsion of substantially all the alcohol wetting liquid from the pores of the sheet. All of the bubble point values set forth herein to describe and illustrate the present invention reflect values determined in this manner using laboratory grade ethanol as the wetting liquid.

The present inventive aramid fiber filtration sheet possesses a first bubble point higher than that which can be achieved with conventional aramid fiber filtration sheets, namely at least about 50 in. water column, and preferably higher than that which can be achieved with glass fiber sheets, namely at least about 100 in. water column. Similarly, the present inventive aramid fiber filtration sheet desirably possesses a 1500 cc/min bubble point higher than that which can be achieved with conventional aramid fiber filtration sheets, namely at least about 100 in. water column, and, even more desirably, higher than that which can be achieved with glass fiber sheets, namely at least about 200 in. water column, and preferably at least about 300 in. water column. The present invention enables the preparation of an aramid fiber filtration sheet having first and 1500 cc/min bubble points an order of magnitude higher than conventional aramid fiber filtration sheets.

The present invention is capable of providing such an aramid fiber filtration sheet while substantially maintaining the uniformity of the pores and narrowness of the pore size distribution of conventional aramid fiber filtration sheets. In particular, the present inventive aramid fiber filtration sheet desirably has a ratio of 1500 cc/min and first bubble points of about 2 or less, more desirably about 1.6 or less.

The present inventive aramid fiber filtration sheet is capable of removing bacteria from fluids in a variety of filtration processes. Specifically, the present inventive aramid fiber filtration sheet is capable of providing a wide range of filtration efficiencies, which are predictable by and related to bubble point, at reasonable thicknesses and sheet weights in a consistent and predictable manner. The present inventive aramid fiber filtration sheet will desirably be characterized by a titer reduction of at least about $10^5$, preferably at least about $10^8$, and most preferably at least about $10^{10}$, against *Pseudomonas diminuta*. Since *Pseudomonas diminuta* is generally accepted as the smallest and highest penetrating test bacteria, its retention by a material is evidence for the material's ability to provide absolute removal of bacteria in most applications. Thus, the present invention is generally capable of "absolute" titer reduction (i.e., $>10^{10}$) against even the smallest bacteria. The present invention accordingly exhibits a heretofore unattainably low pore size and removal efficiency for a fibrous filtration sheet.

Surprisingly, such titer reduction is capable of being achieved by the present inventive aramid fiber filtration sheet at a reasonable thickness and flow resistance. In particular, the present inventive aramid fiber filtration sheet preferably has a thickness of about 20 mils or less, more preferably about 10 mils or less, and most preferably about 5–10 mils. The present inventive aramid fiber filtration sheet desirably has an air flow resistance of about 200 in. water column or less and preferably has an air flow resistance of about 150 in. water column or less, more preferably about 100 in. water column or less, and most preferably about 50 in. water column or less. All of the air flow resistance (i.e., pressure drop or $\Delta P$) values set forth herein to describe and illustrate the present invention reflect values determined using an air flow rate of 28 ft/min in accordance with the general procedure described in U.S. Pat. No. 4,340,479.

The present inventive aramid fiber filtration sheet desirably has a surface area of at least about 15 m$^2$/g, preferably at least about 20 m$^2$/g, as determined by the BET gas adsorption technique (Brunauer et al., *Journal of the American Chemical Society*, 60 (February 1938)). The measurement of fiber surface area in accordance with the BET technique can be carried out by any suitable commercially available apparatus, e.g., Quantachrome Corporation, Part Number 74031 (stem) and Part Number 74030 (macrocell body). The surface area measurements reported herein were carried out using the BET technique on fully formed sheets.

The present inventive aramid fiber filtration sheet can have any suitable sheet weight. The desirable sheet weight of the present inventive aramid fiber filtration sheet will vary depending on the particular application for the aramid fiber filtration sheet. In many applications, the present inventive aramid fiber filtration sheet will generally have a sheet weight no more than about 10 g/ft$^2$ and will desirably have a sheet weight of no more than about 5 g/ft$^2$, preferably no more than about 4 g/ft², and more preferably no more than about 2 g/ft². While the present inventive aramid fiber filtration sheet can have a sheet weight of less than about 1 g/ft², such a filtration sheet will typically have a sheet weight of at least about 1 g/ft², e.g., 1.5–3 g/ft².

Generally, the present inventive aramid fiber filtration sheet will have as low a sheet weight as possible as consistent with reproducible filtration performance. A lower sheet weight will typically result in a lower flow resistance and a thinner sheet, which in turn reduces material costs and enables the easier manipulation of the sheet, particularly the easier corrugation of the sheet without damage for use in a filter cartridge. Further, this will provide higher filter surface area and longer service life. Surprisingly, the desirable properties of the present inventive aramid fiber filtration sheet, including consistent and predictable removal efficiencies, are attainable at very low sheet weights, e.g., to as low as 1 g/ft² and below.

The present invention also provides a method of preparing the aramid fibers which are useful in the construction of the present inventive sheet. Specifically, the present invention includes a method of reducing the diameter of aramid fibers comprising preparing a dispersion of aramid fibers in a fluid and subjecting the dispersion, to fibrillation, particularly mechanical fibrillation, under conditions sufficient to reduce the average diameter of the aramid fibers. The present invention also includes a method of preparing a sheet comprising reducing the diameter of aramid fibers as described herein and preparing a filtration sheet from the reduced-diameter aramid fibers.

Aramid fibers are fibers of poly(paraphenylene terephthalamide) and related compounds wherein the majority of the amide groups are directly attached to two aromatic rings. Aramid fibers are commercially available as Kevlar® fibers (DuPont, Wilmington, Del.) Twaron® fibers (Akzo, Arnhem, Netherlands), Apyeil® fibers (Unitika, Osaka, Japan), and Conex® fibers (Teijin, Osaka, Japan). While any suitable aramid fibers may be used in conjunction with the present invention, Kevlar® 361 and Twaron® 1094 aramid fibers are preferably utilized for purposes of the present invention.

The aramid fibers useful in the context of the present invention may be of any suitable length and will typically be cut fibers of about 1 mm in length. In general, shorter length fibers, such as fibers having lengths of about 1 mm or less, are desirably used in connection with the present invention. The use of shorter length fibers can result in a decrease or avoidance of undesirable entanglements during the preparation of the present inventive aramid fiber filtration sheet and can lead to the preparation of a thinner fibrous filtration sheet with reduced flow resistance while retaining the desirable properties of the present inventive aramid fiber filtration sheet.

The reduction of the diameter of the aramid fibers may be carried out by subjecting any suitable dispersion of the aramid fibers, e.g., aqueous dispersions of about 20 g/l or less, preferably about 2 g/l to about 10 g/l, to any suitable fibrillation means under conditions sufficient to reduce the average diameter of the aramid fibers. Such fibrillation is preferably carried out by subjecting the aramid fiber dispersion to a shear rate of at least about 10,000 sec$^{-1}$, more preferably at least about 20,000 sec$^{-1}$, and most preferably at least about 100,000 sec$^{-1}$. Such fibrillation can be carried out by any suitable device, such as a mill mixer, particularly a Kady Mill Model L (Kinetic Dispersion Corp., Scarborough, Me.), for a sufficient period of time, e.g., about 1–3 hours, a homogenizer, particularly a Union® HTD28 Homogenizer (Union Pump Co., North Andover, Mass.), for a sufficient number of passes, e.g., about 1–50 passes, or a microfluidizer, particularly a Microfluidizer Model M110Y or M110EH (Microfluidics International Corp., Newton, Mass.), for a sufficient number of passes, e.g., about 1–50 passes or more.

It has been found that the processing time is directly related to the filtration efficiency of the resulting filtration sheet prepared from the processed aramid fibers. Thus, for example, it is possible to provide a filtration sheet with a consistent and predictable titer reduction by controlling the processing time of the aramid fibers in a given piece of equipment under constant operating conditions.

The use of a homogenizer or a microfluidizer to treat aramid fibers in the context of the present invention is preferred inasmuch as such equipment provides for fibers with a more narrow distribution of diameters and, therefore, generally a filtration sheet of more narrow pore size distribution. The homogenizer is preferably operated with a pressure drop across the homogenizer of about 7,500 to about 10,000 psi. Similarly, the microfluidizer is preferably operated with a pressure drop across the microfluidizer of about 10,000 to about 16,500 psi. Lower pressures may be utilized; however, more cycles or passes through the homogenizer or microfluidizer may then be required to achieve a similar reduced diameter for the fibers.

The mechanical fibrillation in the context of the present invention is quite different than the mixing which typically takes place in conventional Fourdrinier paper making processes which utilize low-shear mixers such as the Cowles® beat-mixer. Such low-shear mixers, however, may be used to prepare an initial dispersion of the aramid fibers prior to subjecting the dispersion to the mechanical fibrillation in accordance with the present invention. For example, an aramid fiber dispersion may be prepared by low-shear mixing, e.g., by use of a Cowles® beat mixer, in a concentration of up to about 20 g/l, preferably about 2.5–15 g/l, and more preferably about 2.5–10 g/l. Such low-shear mixing will typically be carried out until a satisfactory dispersion is reached, e.g., no lumps are readily apparent in the dispersion, which point will be typically reached within an hour or two. This dispersion may then be diluted before being subjected to the fibrillation process in accordance with the present invention as described above.

The present invention accordingly provides aramid fiber which is capable of being formed into the present inventive aramid fiber filtration sheet. In particular, the aramid fiber of the present invention is characterized by being capable of being formed into a fibrous filtration sheet having a thickness of no more than 20 mil and a first bubble point of at least about 50 in. water column, preferably at least about 100 in. water column. More preferably, the aramid fiber is such that the fibrous filtration sheet formed therefrom would additionally have a 1500 cc/min bubble point of at least about 100 in. water column or, most preferably, at least about 200 in. water column.

Surprisingly, the present invention is capable of reducing the diameter of aramid fibers without substantially adversely affecting other, desirable characteristics of the aramid fibers, including the high modulus, reasonable elongation, high temperature resistance, and good chemical stability of such fibers. Thus, fibrous filtration sheets prepared from such aramid fibers retain the desirable properties of conventional aramid fiber filtration sheets while also exhibiting improved pore size and pore size distribution characteristics.

The present inventive aramid fiber filtration sheet can be prepared from such reduced-diameter aramid fibers by fibrous filtration sheet techniques which are well-known in the art, such as conventional Fourdrinier paper making processes. Unlike glass fibrous sheets, the present inventive sheets do not require added binder resin to maintain a stable filtration sheet. While a binder resin is generally not necessary for such a purpose, a binder resin can nevertheless be used in preparing the present inventive sheet so as to improve the mechanical properties, particularly the tensile properties, of the sheet.

Since the present inventive aramid fiber filtration sheet is hydrophilic and water-wettable, testing of the fibrous sheet can be conveniently carried out using water. In particular, the flow resistance and integrity of the present inventive aramid fiber filtration sheet can be evaluated using water.

The present inventive aramid fiber filtration sheet is preferably mated to a conventional support layer, particularly when the present inventive sheet is prepared without added binder resin. The support layer can comprise any suitable porous structure that provides the desired support characteristics while not adversely affecting the desirable properties of the present inventive sheet, e.g., does not significantly adversely affect flow resistance ($\Delta P$). Suitable materials for the support layer include polymers such as aramid, polyester, polyethylene, polypropylene, and polyamide. Ideally, the support layer should be of the same composition as the polymeric fibrous filtration sheet, although polyester is generally a desirable support material irrespective of the composition of the polymeric fibrous filtration sheet. In the examples set forth herein, a support material of polyester was used in preparing the aramid fiber filtration sheets of the present invention.

The present invention further provides a method of treating a fluid by passing a fluid through the present inventive sheet. In particular, the filtration of a fluid by passing it through the present inventive sheet can reduce the quantity of bacteria in the fluid. Thus, the present inventive filtration method includes passing a fluid which comprises bacteria in excess of $10^2$/ml, or even in excess of $10^4$/ml, through the present inventive aramid fiber filtration sheet such that the fluid has less than $10^2$/ml after being passed through the present inventive aramid fiber filtration sheet, preferably such that the fluid comprises no bacteria after being passed through the present inventive aramid fiber filtration sheet.

The sheet of the present invention can be formed into any suitable configuration and used in the construction of any suitable filter elements by techniques that are well-known in the art. The present inventive sheet is inherently self-supporting; however, the sheet is preferably mated with a variety of support materials to be used alone or in a suitable filter element.

The present inventive polymeric fibrous filtration sheet can be used in suitable filters, filtration cartridges, and the like. The present inventive sheet can be used in dead-end filtration applications, as well as in tangential or cross-flow filtration applications.

The present inventive aramid fiber filtration sheet is expected to be especially useful in filter elements, such as filter cartridges, which are generally described in U.S. Pat. No. 4,340,479. Preferred filter elements utilizing the present inventive sheet comprise the present inventive sheet, wherein the sides of the sheet have been overlapped and sealed to form a tubular configuration having an exterior surface, an interior, and two ends, and end caps sealed to the ends of the tube, wherein at least one of the end caps has a central aperture providing access to the interior of the tube, and all of the seals are fluid-tight. The present inventive aramid fiber filtration sheet is preferably corrugated or pleated in such a filter element so as to provide a large surface area for the volume of the filter element. At least one of the sides of the sheet can be mated to a porous support layer, and, in such a situation, the aramid fiber filtration sheet and porous support layer will generally both be corrugated. The filter element can comprise a single sheet of the present invention or, more preferably, comprises multiple such sheets mated together. When there are multiple aramid fiber filtration sheets in the filter element, the sheets can be separated by a porous support layer to which each sheet is mated, or, when there are two aramid fiber filtration sheets, the sheets can be positioned such that there is no porous support layer therebetween. The other aspects of the filter element may be of any suitable construction and prepared from any suitable material. For example, the end caps can be prepared from a suitable thermoplastic material, such as polyolefin, polyamide, and polyester, particularly, polybutylene glycol terephthalate or polyethylene glycol terephthalate. The filter element can be constructed using techniques which are well-known in the art.

The present inventive aramid fiber filtration sheet is expected to be also useful in helically wrapped filter elements, such as filter septa. Such filter elements are generally described in U.S. Pat. No. 5,290,446. Helically wrapped filter elements in accordance with the present invention will typically comprise the present inventive aramid fiber filtration sheet which is helically wrapped around a pervious, hollow tube to form an overlap of 0% to about 95% of the width of the filtration sheet. There may be one or more such helically wrapped filtration sheets, and there is preferably at least one diffusion layer which allows for lateral flow of fluid within the filter element positioned between the filtration sheet and the pervious, hollow tube and/or between successive filtration sheets.

The following examples further illustrate the present invention and, of course, should not be construed as in any way limiting its scope.

EXAMPLE 1

This example illustrates the current state of the art of glass and aramid fibrous sheets. Specifically, this example sets forth some of the best attainable properties of fibrous filtration sheets prepared from glass and aramid fibers in a conventional manner.

Schuller Code 90 glass microfibers (Schuller, Waterville, Ohio) are about 0.25 micron in diameter and are the finest fibers commercially available. A filtration sheet was prepared from such glass microfibers in an attempt to achieve the highest first bubble point possible for such a fibrous filtration sheet. Fibrous filtration sheets were similarly prepared from Kevlar® 361 aramid fibers. Such conventionally prepared aramid fiber filtration sheets are commercially available as Ultisep® filtration media (Pall, Glen Cove, N.Y.).

The properties of these conventionally prepared glass and aramid fibrous sheets are set forth in Table 1.

TABLE 1

| Sample | Sheet Weight (g/ft$^2$) | First Bubble Point (in. wc) | 1500 cc/min Bubble Point (in. wc) | BP$_{1500\ cc/min}$/BP$_{first}$ |
|---|---|---|---|---|
| glass | 1.7 | 83 | 176 | 2.1 |
| aramid | 5–7 | 15–25 | 40–65 | 2.7–3.2 |

As is apparent from the properties of these conventionally prepared glass and aramid fibrous sheets, the finest pore size glass fibrous sheet has a significantly smaller pore size in comparison to the finest pore size aramid fibrous sheet. Further increases in the sheet weight of the glass fibrous sheet had no beneficial effect on elevating the bubble points and only served to increase the thickness and flow resistance ($\Delta P$).

EXAMPLE 2

This example illustrates the preparation of aramid fiber filtration sheets in accordance with the present invention utilizing a high shear rotor-stator mill mixer to prepare the reduced-diameter aramid fibers which form the fibrous filtration sheets.

Three identical batches of aqueous dispersions were prepared of 10.0 g/l Twaron® 1094 aramid fibers. Each of these three aramid fiber dispersions was subjected to processing in a Kady Mill Model L mill mixer for the indicated times of 0, 60, or 120 minutes at the maximum operating conditions specified by the equipment manufacturer, namely at about 9000 ft/min tip speed. Each of the three aramid fiber samples was then used to prepare a fibrous filtration sheet, without added binder resin, using conventional fibrous filtration sheet preparation techniques, such as disclosed in U.S. Pat. No. 4,523,995. The physical properties of the fibrous filtration sheets were measured to determine the thickness, sheet weight, surface area, first and 1500 cc/min bubble points (alcohol wet), ratio of the 1500 cc/min and first bubble points, and air flow resistance ($\Delta P$). The results of these measurements are set forth in Table 2.

TABLE 2

| Sample | Mill Processing Time (min) | Thickness (mil) | Sheet Weight (g/ft$^2$) | Surface Area (m$^2$/g) | First Bubble Point (in. wc) | 1500 cc/min Bubble Point (in. wc) | $BP_{1500\ cc/min}/BP_{first}$ | $\Delta P$ (in. wc) |
|---|---|---|---|---|---|---|---|---|
| 2A | 0 | 9 | 3.5 | 12.2 | 32.2 | 50.6 | 1.6 | 8.1 |
| 2B | 60 | 7 | 3.5 | 20.3 | 113.5 | 196.5 | 1.7 | 40.1 |
| 2C | 120 | 7 | 3.5 | 24.8 | 160.9 | 279.0 | 1.7 | 61.9 |
| 2D | 180 | 7 | 3.5 | — | 202.0 | 358.0 | 1.7 | 75.1 |

The results set forth in Table 2 are depicted in the graph of FIG. 1, wherein the first and 1500 cc/min bubble points (in. water column) have been plotted as a function of the mill residence time (min). The first bubble points are represented by the circles in FIG. 1, while the 1500 cc/min bubble points are represented by the crosses in FIG. 1. The above results and FIG. 1 indicate that the processing of commercially available aramid fibers in a rotor-stator mill mixer significantly and controllably reduces the fiber diameter of the aramid fibers and allows for the preparation of fibrous filtration sheets of heretofore unknown smaller pore size (as reflected by the first bubble point), while providing a narrow pore size distribution (as reflected by the ratio of the 1500 cc/min and first bubble points). The increase in the mill residence time resulted in increasingly smaller diameter aramid fibers in a regular manner as reflected in the increased surface area and bubble points, providing for fibrous filtration sheets of increasingly smaller pore sizes and higher filtration efficiencies.

EXAMPLE 3

This example illustrates the preparation of aramid fiber filtration sheets in accordance with the present invention utilizing a homogenizer to prepare the reduced-diameter aramid fibers which form the fibrous filtration sheets.

Four identical batches of aqueous dispersions were prepared of 2.5 g/l Twaron® 1094 aramid fibers. Each of these four aramid fiber dispersions was subjected to processing in a Union® HTD28 Homogenizer for the indicated number of passes of 0, 8, 16, or 24 passes at the maximum operating conditions specified by the equipment manufacturer, namely at about 9000 psi. Each of the four aramid fiber samples was then used to prepare a fibrous filtration sheet, without added binder resin, using conventional fibrous filtration sheet preparation techniques as in Example 2. The physical properties of the fibrous filtration sheets were measured to determine the thickness, sheet weight, surface area, first and 1500 cc/min bubble points (alcohol wet), ratio of the 1500 cc/min and first bubble points, and air flow resistance ($\Delta P$). The results of these measurements are set forth in Table 3.

TABLE 3

| Sample | No. Homogenizer Passes | Thickness (mil) | Sheet Weight (g/ft$^2$) | Surface Area (m$^2$/g) | First Bubble Point (in. wc) | 1500 cc/min Bubble Point (in. wc) | $BP_{1500\ cc/min}/BP_{first}$ | $\Delta P$ (in. wc) |
|---|---|---|---|---|---|---|---|---|
| 3A | 0 | 9 | 3.7 | 12.2 | 32.2 | 50.6 | 1.6 | 8.1 |
| 3B | 8 | 9 | 3.7 | 18.3 | 126.9 | 220.1 | 1.7 | 42.8 |
| 3C | 16 | 9 | 3.7 | 24.2 | 200.9 | 330.1 | 1.6 | 71.4 |
| 3D | 24 | 9 | 3.7 | 28.6 | 255.0 | 386.0 | 1.5 | 86.0 |

Figure 2:
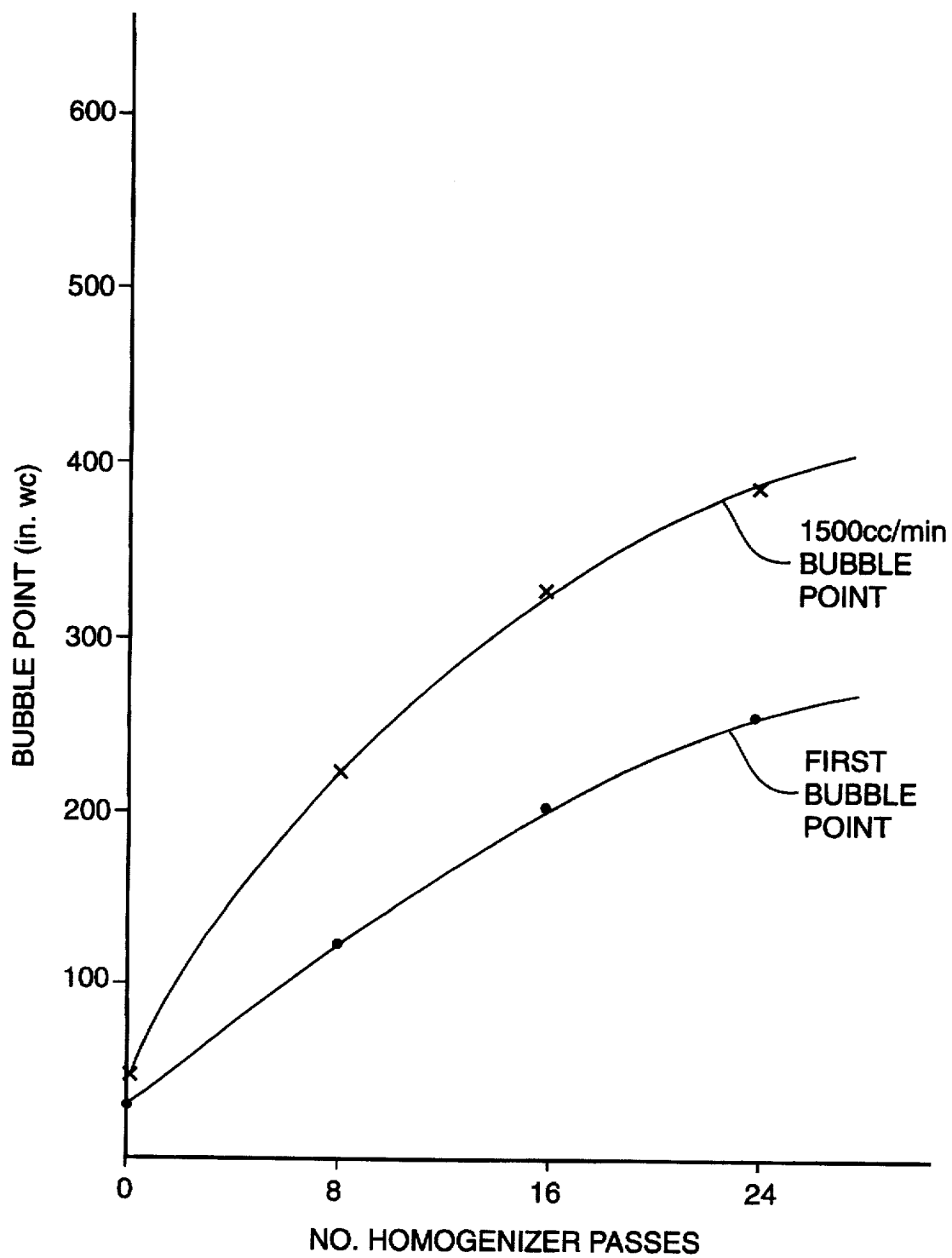
FIG. 2 is a graph depicting curves showing the relationship between the number of homogenizer passes used to prepare the aramid fibers of an aramid fiber filtration sheet and the resulting first and 1500 cc/min bubble points (in. water column) of the aramid fiber filtration sheet.

The results set forth Table 3 are depicted in the graph of FIG. 2, wherein the first and 1500 cc/min bubble points (in. water column) have been plotted as a function of the number of homogenizer passes. The first bubble points are represented by the circles in FIG. 2, while the 1500 cc/min bubble points are represented by the crosses in FIG. 2. As is apparent from the above results and the graph of FIG. 2, the passage of commercially available aramid fibers through a homogenizer significantly and controllably reduces the fiber diameter of the aramid fibers and allows for the preparation of fibrous filtration sheets of heretofore unknown smaller pore size (as reflected by the first bubble point), while providing a narrow pore size distribution (as reflected by the ratio of the 1500 cc/min and first bubble points). The increase in the number of homogenizer passes resulted in increasingly smaller diameter aramid fibers in a regular manner as reflected in the increased surface area and bubble points, providing for fibrous filtration sheets of increasingly smaller pore sizes and higher filtration efficiencies.

EXAMPLE 4

This example illustrates the preparation of aramid fiber filtration sheets in accordance with the present invention utilizing a microfluidizer to prepare the reduced-diameter aramid fibers which form the fibrous filtration sheets.

Five identical batches of aqueous dispersions were prepared of 2.5 g/l Twaron® 1094 aramid fibers. Each of these five aramid fiber dispersions was subjected to processing in a Microfluidics Model M110Y Microfluidizer for the indicated number of passes of 0, 12, 15, 18, or 40 passes at maximum operating conditions specified by the equipment manufacturer, namely at about 16,500 psi. Each of the five aramid fiber samples was then used to prepare a fibrous filtration sheet, without added binder resin, using conventional fibrous filtration sheet preparation techniques as in Example 2. The physical properties of the fibrous filtration sheets were measured to determine the thickness, sheet weight, surface area, first and 1500 cc/min bubble points (alcohol wet), ratio of the 1500 cc/min and first bubble points, and air flow resistance ($\Delta P$). The results of these measurements are set forth in Table 4.

TABLE 4

| Sample | No. Microfluidizer Passes | Thickness (mil) | Sheet Weight (g/ft$^2$) | Surface Area (m$^2$/g) | First Bubble Point (in. wc) | 1500 cc/min Bubble Point (in. wc) | $BP_{1500\ cc/min}/BP_{first}$ | $\Delta P$ (in. wc) |
|---|---|---|---|---|---|---|---|---|
| 4A | 0  | 9.0 | 3.7 | 12.2 | 32.2 | 50.6 | 1.6 | 8.1 |
| 4B | 12 | 8.5 | 3.7 | 23.4 | 264  | 405  | 1.5 | 92.5 |
| 4C | 15 | 9.0 | 3.8 | 26.2 | 307  | 450  | 1.5 | 106.5 |
| 4D | 18 | 9.0 | 3.9 | 26.7 | 352  | 512  | 1.5 | 136.3 |
| 4E | 40 | 8.5 | 3.8 | 34.0 | 472  | 638  | 1.4 | 157.8 |

Figure 3:
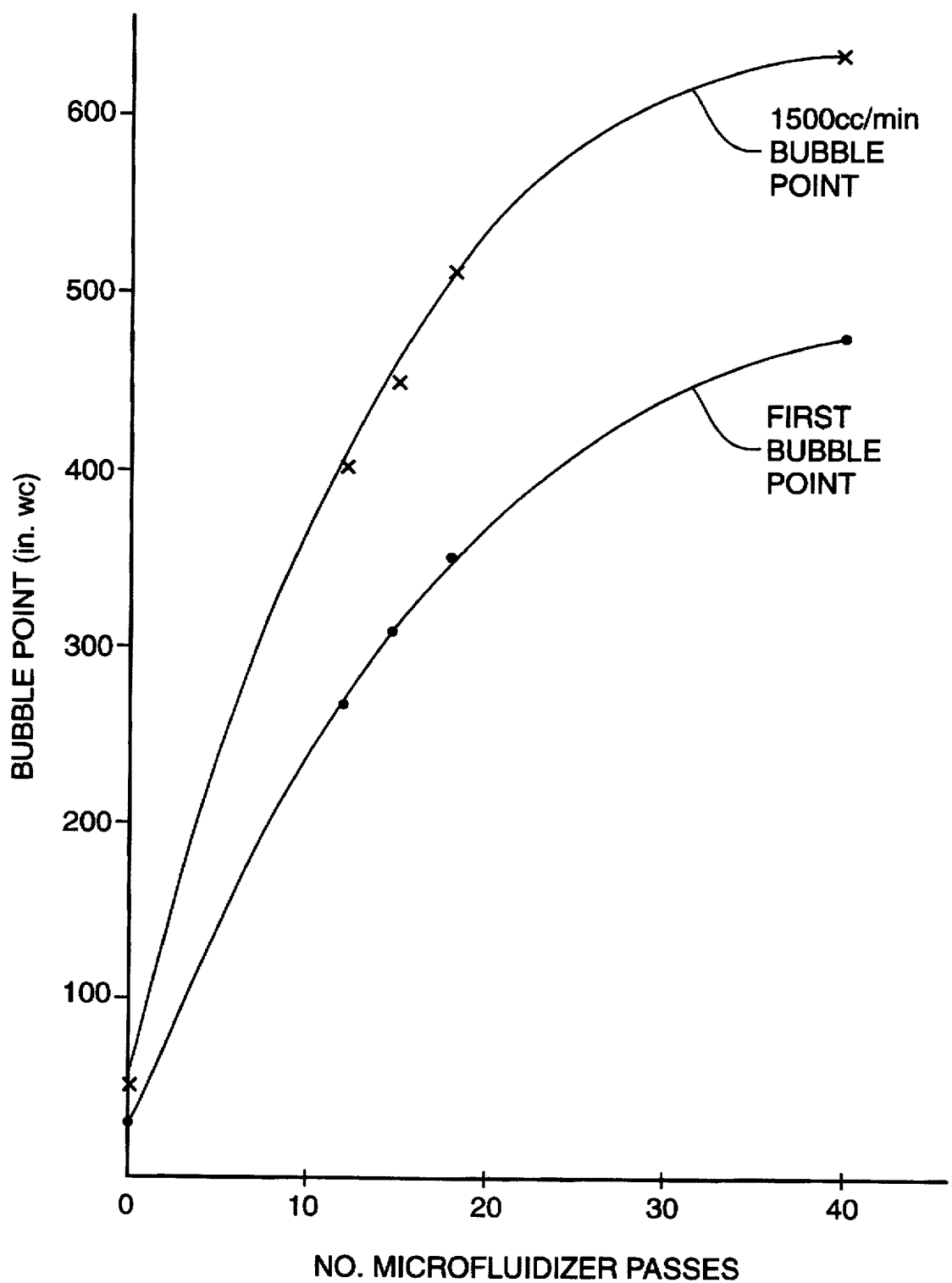
FIG. 3 is a graph depicting curves showing the relationship between the number of microfluidizer passes used to prepare the aramid fibers of an aramid fiber filtration sheet and the resulting first and 1500 cc/min bubble points (in. water column) of the aramid fiber filtration sheet.

The results set forth in Table 4 are depicted in the graph of FIG. 3, wherein the first and 1500 cc/min bubble points (in. water column) have been plotted as a function of the number of microfluidizer passes. The first bubble points are represented by the circles in FIG. 3, while the 1500 cc/min bubble points are represented by the crosses in FIG. 3. As is apparent from the above results and the graph of FIG. 3, the passage of commercially available aramid fibers through a microfluidizer significantly and controllably reduces the fiber diameter of the aramid fibers and allows for the preparation of fibrous filtration sheets of heretofore unknown smaller pore size (as reflected by the first bubble point), while providing a narrow pore size distribution (as reflected by the ratio of the 1500 cc/min and first bubble points). The increase in the number of microfluidizer passes resulted in increasingly smaller diameter aramid fibers in a regular manner as reflected in the increased surface area and bubble points, providing for fibrous filtration sheets of increasingly smaller pore sizes and higher filtration efficiencies.

EXAMPLE 5

This example further illustrates the preparation of aramid fiber filtration sheets in accordance with the present invention and the porosity of such sheets as a function of air flow resistance as compared to a glass fibrous sheet.

Three identical batches of aqueous dispersions were prepared of 2.5 g/l Twaron® 1094 aramid fibers, and the aramid fiber dispersions were subjected to processing in a Union® HTD28 Homogenizer for the indicated number of passes of 8, 16, or 24 passes in the same manner as set forth in Example 3. Each of the three aramid fiber samples was then used to prepare fibrous filtration sheet, without added binder resin, using conventional fibrous filtration sheet preparation techniques as in Example 2. For comparative purposes, a glass fibrous sheet was similarly prepared. The physical properties of the fibrous filtration sheets were measured to determine the thickness, sheet weight, surface area, first and 1500 cc/min bubble points (alcohol wet), ratio of the 1500 cc/min and first bubble points, and air flow resistance ($\Delta P$). The results of these measurements are set forth in Table 5.

TABLE 5

| Sample | No. Homogenizer Passes | Thickness (mil) | Sheet Weight (g/ft$^2$) | Surface Area (m$^2$/g) | First Bubble Point (in. wc) | 1500 cc/min Bubble Point (in. wc) | $BP_{1500\ cc/min}/BP_{first}$ | $\Delta P$ (in. wc) | $BP_{first}/\Delta P$ |
|---|---|---|---|---|---|---|---|---|---|
| 5A | 8 | 1.5 | 0.81 | 18.2 | 89 | 142 | 1.6 | 7.9 | 11.3 |
| 5B | 16 | 1.5 | 0.72 | 24.2 | 144 | 235 | 1.6 | 12.9 | 11.2 |
| 5C | 24 | 2.0 | 0.83 | 28.6 | 193 | 304 | 1.6 | 18.0 | 10.7 |
| glass | — | 9.0 | 1.7 | 5.8 | 83 | 176 | 2.1 | 11.4 | 7.3 |

Figure 4:
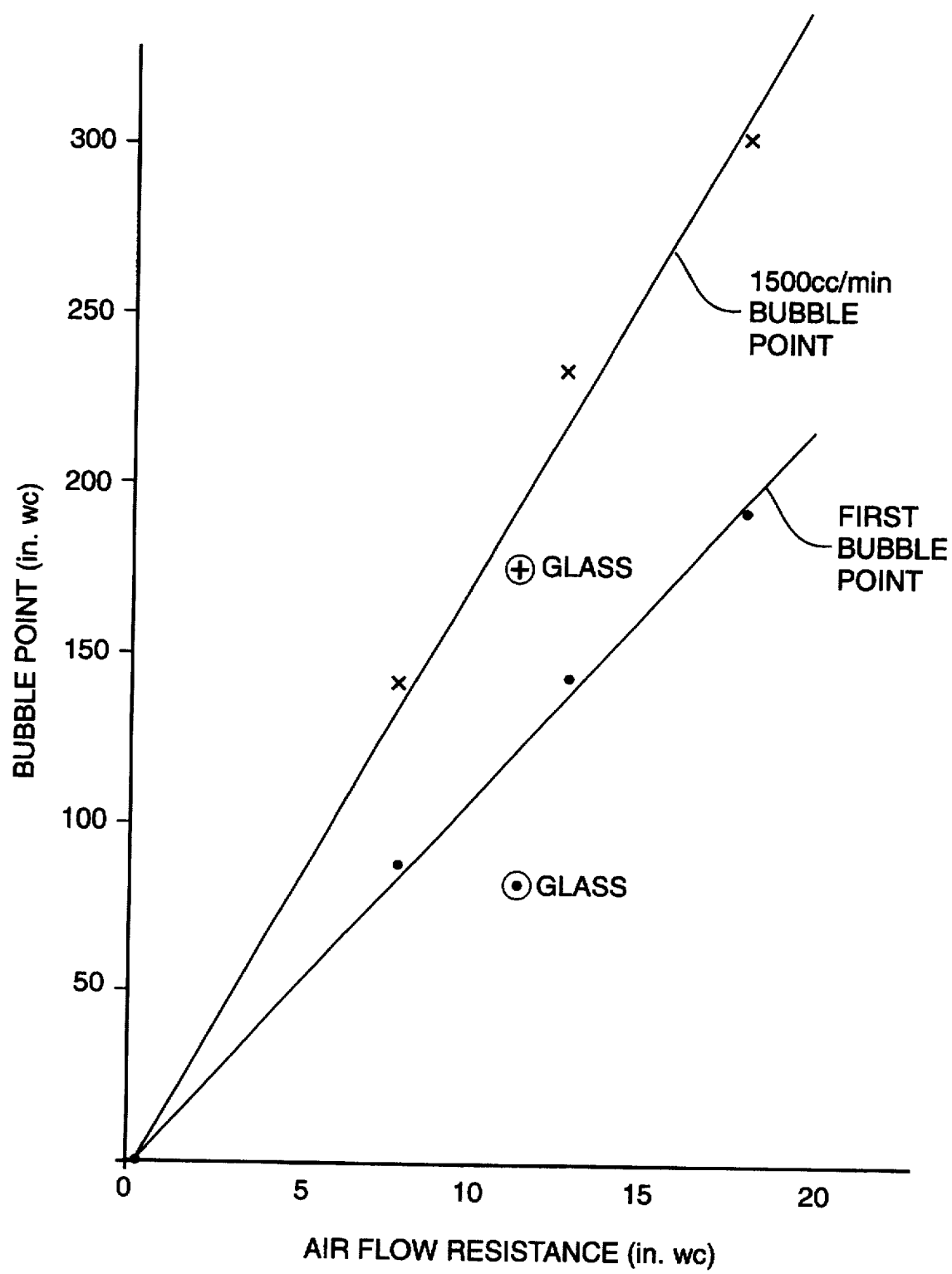
FIG. 4 is a graph depicting curves showing the relationship between the air flow resistance of an aramid fiber filtration sheet and a comparative glass fiber sheet and the first and 1500 cc/min bubble points (in. water column) of the fibrous filtration sheets.

The results set forth in Table 5 are depicted in the graph of FIG. 4, wherein the first and 1500 cc/min bubble points (in. water column) have been plotted as a function of the air flow resistance through the fibrous filtration sheet. The first bubble points are represented by the circles in FIG. 4, while the 1500 cc/min bubble points are represented by the crosses in FIG. 4.

These results demonstrate that the present inventive aramid fiber filtration sheet can have an excellent bubble point per unit of air flow resistance as compared to the finest pore size glass fibrous sheet. Moreover, the present inventive aramid fiber filtration sheet can maintain this excellent bubble point/air flow resistance ratio at nearly twice the highest bubble point available for a glass fibrous sheet at an approximately 50% higher ratio of bubble point/air flow resistance. In addition, such a desirable property of the present inventive aramid fiber sheet can be achieved at about one-fourth the thickness of a glass fibrous sheet.

Furthermore, as shown in these results and in FIG. 4, at an equivalent air flow resistance for a glass fibrous sheet, an aramid fiber filtration sheet can be prepared with higher first and 1500 cc/min bubble points. There is also a large difference in surface area (on the order of four times) and density between the present inventive aramid fiber filtration sheet and the glass fibrous sheet, which reflects a significantly larger number of aramid fibers per unit weight for pore development.

EXAMPLE 6

This example illustrates the excellent titer reduction against bacteria of the present inventive aramid fiber filtration sheets.

Aqueous dispersions were prepared of 2.5 g/l Twaron® 1094 aramid fibers, and the aramid fiber dispersions were subjected to 4-36 passes through a Union® HTD28 Homogenizer at maximum stable operating pressure (generally about 9000 psi) (Samples 6A-6Q) or to 18 passes through a Microfluidics Model M110Y Microfluidizer at maximum stable operating pressure (generally about 16,500 psi) (Sample 6R). The resulting aramid fiber dispersions were then used to prepare fibrous filtration media of different sheet weights and thicknesses using the same general fibrous filtration sheet preparation method as in Example 2. The physical properties of the fibrous filtration sheets were measured to determine the thickness, sheet weight, surface area, first and 1500 cc/min bubble points (alcohol wet), ratio of the 1500 cc/min and first bubble points, and air flow resistance ($\Delta P$), as well as the titer reduction ($T_R$) against *Pseudomonas diminuta*, which is an accepted test bacteria used to demonstrate a filter medium's ability to deliver sterile effluent. The results of these measurements are set forth in Table 6. The results reflect measurements made on a single layer of the fibrous filtration sheet, except for the titer reduction value which reflects a measurement on either one or two layers of the fibrous filtration sheet as indicated in Table 6.

TABLE 6

| Sample | No. Homogenizer or Microfluidizer Passes | Thickness (mil) | No. Layers | Sheet Weight (g/ft$^2$) | First Bubble Point (in. wc) | 1500 cc/min Bubble Point (in. wc) | $BP_{1500\ cc/min}/BP_{first}$ | $\Delta P$ (in. wc) | $T_R$ |
|---|---|---|---|---|---|---|---|---|---|
| 6A | 4 | 4.0 | 2 | 1.4 | 73 | 123 | 1.7 | 10.8 | $4.9 \times 10^1$ |
| 6B | 4 | 9.5 | 1 | 3.7 | 85 | 151 | 1.8 | 29.8 | $4.1 \times 10^4$ |
| 6C | 10 | 4.0 | 2 | 1.4 | 97 | 170 | 1.8 | 15.1 | $4.6 \times 10^5$ |
| 6D | 10 | 9.0 | 1 | 3.7 | 120 | 210 | 1.8 | 41.5 | $1.4 \times 10^6$ |
| 6E | 16 | 3.5 | 1 | 1.3 | 141 | 230 | 1.6 | 20.2 | $1.4 \times 10^4$ |
| 6F | 16 | 3.5 | 2 | 1.3 | 141 | 230 | 1.6 | 20.2 | $>3.8 \times 10^{10}$ |
| 6G | 16 | 9.5 | 1 | 3.7 | 159 | 264 | 1.7 | 55.2 | $7.6 \times 10^9$ |
| 6H | 22 | 4.0 | 1 | 1.5 | 184 | 287 | 1.6 | 28.1 | $5.4 \times 10^3$ |
| 6I | 22 | 4.0 | 2 | 1.5 | 184 | 287 | 1.6 | 28.1 | $>3.8 \times 10^{10}$ |
| 6J | 22 | 9.5 | 1 | 3.7 | 197 | 316 | 1.6 | 66.6 | $>3.8 \times 10^{10}$ |
| 6K | 28 | 4.5 | 1 | 1.6 | 216 | 333 | 1.5 | 35.0 | $4.0 \times 10^6$ |
| 6L | 28 | 4.5 | 2 | 1.6 | 216 | 333 | 1.5 | 35.0 | $>2.0 \times 10^{10}$ |
| 6M | 28 | 9.0 | 1 | 3.6 | 240 | 366 | 1.5 | 78.2 | $>2.0 \times 10^{10}$ |
| 6N | 36 | 4.5 | 1 | 1.6 | 262 | 385 | 1.5 | 41.5 | $9.0 \times 10^5$ |
| 6P | 36 | 4.5 | 2 | 1.6 | 262 | 385 | 1.5 | 41.5 | $>2.0 \times 10^{10}$ |
| 6Q | 36 | 8.5 | 1 | 3.6 | 282 | 416 | 1.5 | 88.4 | $>2.0 \times 10^{10}$ |
| 6R | 18 | 4.5 | 1 | 1.5 | 300 | 439 | 1.5 | 46.6 | $1.9 \times 10^8$ |

Figure 5:
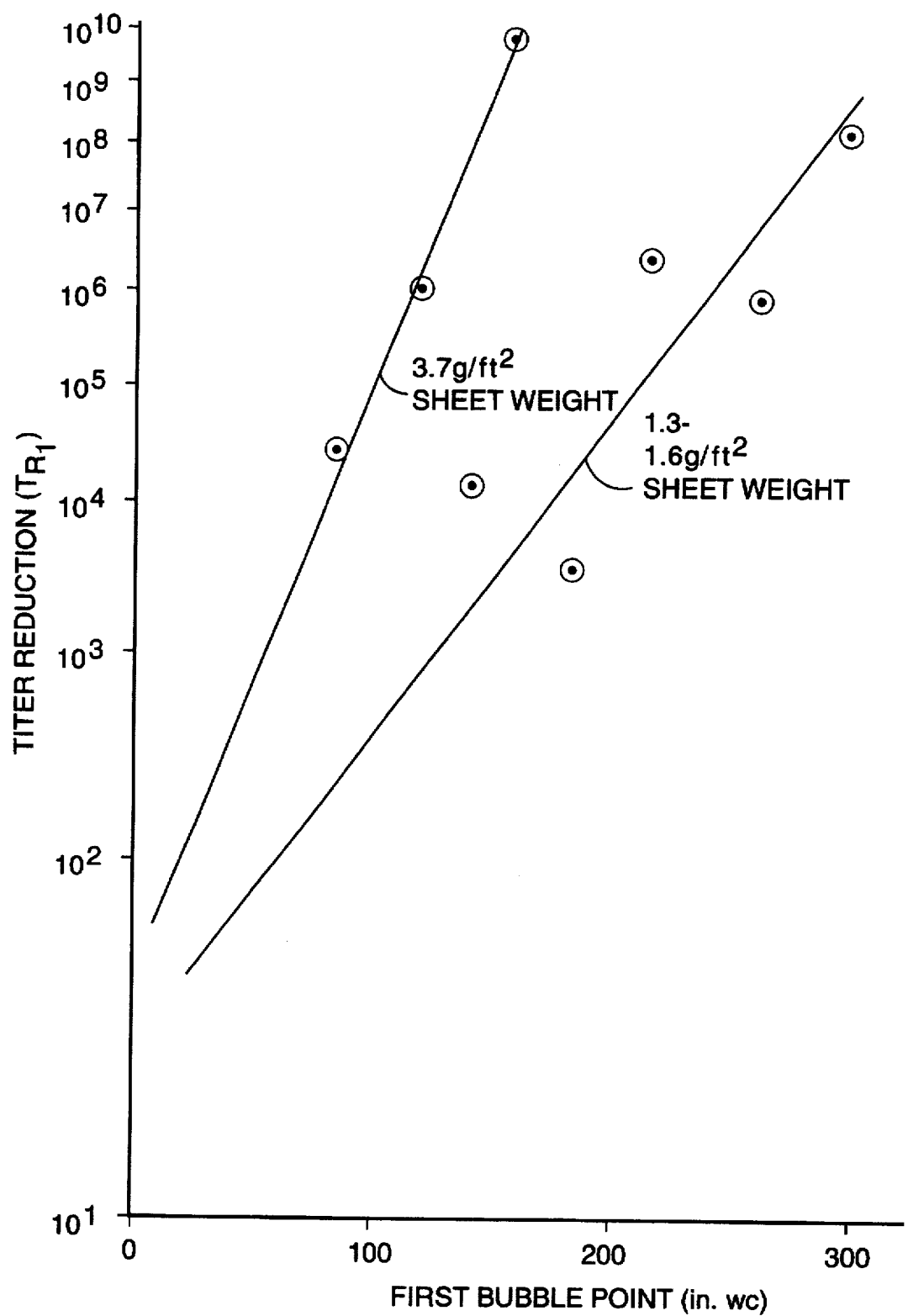
FIG. 5 is a semi-log graph depicting curves showing the relationship between the first bubble point (in. water column) of aramid fiber filtration sheets of differing sheet weights (1.3–1.6 and 3.7 g/ft$^2$) and the resulting titer reduction (against *Pseudomonas diminuta*) of the aramid fiber filtration sheets.

Certain of these results set forth in Table 6 are depicted in the graph of FIG. 5, wherein the first bubble point (in. water column) has been plotted in a semi-log fashion as a function of titer reduction against *Pseudomonas diminuta* of the aramid fiber filtration sheet for sheet weights of 1.3-1.6 g/ft$^2$ (Samples 6E, 6H, 6K, 6N, and 6R) and 3.7 g/ft$^2$ (Samples 6B, 6D, and 6G).

These results demonstrate a functional and predictable relationship between first bubble point and *Pseudomonas diminuta* titer reduction at fixed sheet weight. At a sheet weight of about 3.7 g/ft², a titer reduction of about 10⁵ is obtained when the first bubble point is at least about 100 in. water column, while an absolute titer reduction (>10¹⁰) is obtained when the first bubble point is at least about 170 in. water column. By comparison, at a lower sheet weight of about 1.3–1.6 g/ft², a titer reduction of about 10⁵ is obtained when the first bubble point is at least about 200 in. water column, while an absolute titer reduction (>10¹⁰) is obtained when the first bubble point is at least about 325 in. water column.

strength (lb/linear in. at fixed thickness). The results of these measurements are set forth in Table 8.

TABLE 8

| Sample | Wt. % Resin | Thickness (mil) | Sheet Weight (g/ft²) | First Bubble Point (in. wc) | 1500 cc/min Bubble Point (in. wc) | $BP_{1500\ cc/min}/BP_{first}$ | ΔP (in. wc) | Tensile Strength (lb/linear in.) |
|---|---|---|---|---|---|---|---|---|
| 8A | 0 | 4.0 | 1.7 | 303 | 433 | 1.4 | 47 | 0.62 |
| 8B | 5 | 4.0 | 1.7 | 316 | 451 | 1.4 | 51 | 1.9 |
| 8C | 10 | 4.0 | 1.8 | 319 | 472 | 1.5 | 58 | 2.8 |

The results set forth in Table 8 demonstrate that, if desired, binder resin can be used in the preparation of the present inventive aramid fiber filtration sheet and that the use of such binder resin results in a significant increase in tensile properties with a relatively minimal impact on bubble point and air flow resistance of the fibrous filtration sheet. The high degree of elastic deformation of the fibrous filtration sheet should render these sheets particularly suitable in pulsed applications and should render these sheets more tolerant to typical corrugation and filter element assembly.

All of the references cited herein, including publications, patents, and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

EXAMPLE 7

This example illustrates the tensile properties of aramid fiber filtration sheets prepared in accordance with the present invention.

Aramid fiber filtration sheets were prepared from Twaron® 1094 aramid fibers in accordance with the procedure of Example 3 with differing numbers of passes through the Union® HTD28 Homogenizer. The resulting aramid fiber filtration sheets had a sheet weight of 3.7 g/ft². The tensile strengths (lb/linear in. at about the same thickness) of these aramid fiber filtration sheets are set forth in Table 7.

TABLE 7

| Sample | No. Homogenizer Passes | Tensile Strength (lb/linear in.) |
|---|---|---|
| 7A | 0 | 1.44 +/– 0.10 |
| 7B | 4 | 1.04 +/– 0.09 |
| 7C | 10 | 1.04 +/– 0.22 |
| 7D | 16 | 1.31 +/– 0.19 |
| 7E | 22 | 1.08 +/– 0.19 |
| 7F | 28 | 1.24 +/– 0.16 |
| 7G | 36 | 1.42 +/– 0.11 |

The results set forth in Table 7 demonstrate the good tensile strength of the present inventive aramid fiber filtration sheet without added binder resin. Indeed, the tensile strength dramatically improved for those fibrous filtration sheets prepared in accordance with the present invention (samples 7B–7G) as compared to the fibrous filtration sheet prepared in the conventional manner (sample 7A).

EXAMPLE 8

This example illustrates the properties of the present inventive aramid fiber filtration sheets with respect to the amount of added resin binder used to prepare such fiber filtration sheets.

Aramid fiber filtration sheets were prepared from Twaron® 1094 aramid fibers in accordance with the procedure of Example 3 with 50 passes through the Union® HTD28 Homogenizer and utilizing 0, 5, and 10 wt. % binder resin. The physical properties of the fibrous filtration sheets were measured to determine the sheet weight, first and 1500 cc/min bubble points (alcohol wet), ratio of the 1500 cc/min and first bubble points, air flow resistance (ΔP), and tensile

What is claimed is:

1. A method of treating a fluid comprising passing a fluid through an aramid fiber sheet having a first bubble point of about 100 in. water column or more.

2. The method of claim 1, wherein said fluid comprises bacteria in excess of 10²/ml before being passed through said aramid fiber sheet and less than 10²/ml after being passed through said aramid fiber sheet.

3. The method of claim 2, wherein said fluid comprises bacteria in excess of 10⁴/ml before being passed through said aramid fiber sheet.

4. The method of claim 3, wherein said fluid comprises no bacteria after being passed through said aramid fiber sheet.

5. A method of treating a fluid comprising passing a fluid through an aramid fiber sheet having a titer reduction of about 10⁵ or more against Pseudomonas diminuta.

6. The method of claim 5, wherein said fluid comprises bacteria in excess of 10²/ml before being passed through said aramid fiber sheet and less than 10²/ml after being passed through said aramid fiber sheet.

7. The method of claim 6, wherein said fluid comprises bacteria in excess of 10⁴/ml before being passed through said aramid fiber sheet.

8. The method of claim 7, wherein said fluid comprises no bacteria after being passed through said aramid fiber sheet.

9. A filter element comprising an aramid fiber sheet having a first bubble point of about 100 in. water column or more and sides which have been overlapped and sealed to form a tubular configuration having an exterior surface, an interior, and two ends, and end caps sealed to the ends of the tube, wherein at least one of said end caps has a central aperture providing access to the interior of the tube, and all of said seals are fluid-tight.

10. The filter element of claim 9, wherein said aramid fiber sheet is corrugated.

11. The filter element of claim 9, wherein at least one of the sides of said aramid fiber sheet is mated to a porous support layer.

12. The filter element of claim 11, wherein said aramid fiber sheet and said porous support layer are corrugated.

13. The filter element of claim 12, wherein said filter element comprises multiple aramid fiber sheets mated together.

14. A filter element comprising an aramid fiber sheet having a titer reduction of about $10^5$ or more against *Pseudomonas diminuta* and sides which have been overlapped and sealed to form a tubular configuration having an exterior surface, an interior, and two ends, and end caps sealed to the ends of the tube, wherein at least one of said end caps has a central aperture providing access to the interior of the tube, and all of said seals are fluid-tight.

15. The filter element of claim 14, wherein said aramid fiber sheet is corrugated.

16. The filter element of claim 14, wherein at least one of the sides of said aramid fiber sheet is mated to a porous support layer.

17. The filter element of claim 16, wherein said aramid fiber sheet and said porous support layer are corrugated.

18. The filter element of claim 17, wherein said filter element comprises multiple aramid fiber sheets mated together.

19. A filter element comprising an aramid fiber sheet having a first bubble point of about 100 in. water column or more helically wrapped around a pervious, hollow tube to form an overlap of 0% to about 95% of the width of said aramid fiber sheet.

20. The filter element of claim 19, wherein said filter element further comprises a diffusion layer positioned between said aramid fiber sheet and said pervious, hollow tube.

21. The filter element of claim 20, wherein said filter element further comprises at least two aramid fiber sheets and at least one diffusion layer positioned between at least two successive aramid fiber sheets.

22. A filter element comprising an aramid fiber sheet having a titer reduction of about $10^5$ or more against *Pseudomonas diminuta* helically wrapped around a pervious, hollow tube to form an overlap of 0% to about 95% of the width of said aramid fiber sheet.

23. The filter element of claim 22, wherein said filter element further comprises a diffusion layer positioned between said aramid fiber sheet and said pervious, hollow tube.

24. The filter element of claim 23, wherein said filter element further comprises at least two aramid fiber sheets and at least one diffusion layer positioned between at least two successive aramid fiber sheets.

25. The method of claim 1, wherein said aramid fiber sheet has a ratio of 1500 cc/min bubble point to first bubble point of about 2 or less.

26. The method of claim 25, wherein said aramid fiber sheet has a ratio of 1500 cc/min bubble point to first bubble point of about 1.6 or less.

27. The method of claim 1, wherein said aramid fiber sheet has a 1500 cc/min bubble point of about 200 in. water column or more.

28. The method of claim 27, wherein said aramid fiber sheet has a ratio of 1500 cc/min bubble point to first bubble point of about 2 or less.

29. The method of claim 28, wherein said aramid fiber sheet has a ratio of 1500 cc/min bubble point to first bubble point of about 1.6 or less.

30. The method of claim 1, wherein said aramid fiber sheet has a thickness of about 20 mils or less.

31. The method of claim 30, wherein said aramid fiber sheet has a thickness of about 10 mils or less.

32. The method of claim 30, wherein said aramid fiber sheet has a sheet weight of about 5 g/ft$^2$ or less.

33. The method of claim 32, wherein said aramid fiber sheet has a sheet weight of about 4 g/ft$^2$ or less.

34. The method of claim 33, wherein said aramid fiber sheet has a sheet weight of about 2 g/ft$^2$ or less.

35. The method of claim 1, wherein said aramid fiber sheet has an air flow resistance of about 100 in. water column or less.

36. The method of claim 1, wherein said aramid fiber sheet has no added binder resin.

37. The method of claim 5, wherein said aramid fiber sheet has a titer reduction of about $10^8$ or more against *Pseudomonas diminuta*.

38. The method of claim 37, wherein said aramid fiber sheet has a titer reduction of about $10^{10}$ or more against *Pseudomonas diminuta*.

39. The method of claim 5, wherein said aramid fiber sheet has a thickness of about 20 mils or less.

40. The method of claim 39, wherein said aramid fiber sheet has a thickness of about 10 mils or less.

41. The method of claim 39, wherein said aramid fiber sheet has a sheet weight of about 5 g/ft$^2$ or less.

42. The method of claim 41, wherein said aramid fiber sheet has a sheet weight of about 4 g/ft$^2$ or less.

43. The method of claim 42, wherein said aramid fiber sheet has a sheet weight of about 2 g/ft$^2$ or less.

44. The method of claim 5, wherein said aramid fiber sheet has an air flow resistance of about 100 in. water column or less.

45. The method of claim 5, wherein said aramid fiber sheet has no added binder resin.

46. A filter element comprising an aramid fiber sheet having a first bubble point of about 100 in. water column or more.

47. The filter element of claim 46, wherein said aramid fiber sheet has a ratio of 1500 cc/min bubble point to first bubble point of about 2 or less.

48. The filter element of claim 47, wherein said aramid fiber sheet has a ratio of 1500 cc/min bubble point to first bubble point of about 1.6 or less.

49. The filter element of claim 46, wherein said aramid fiber sheet has a 1500 cc/min bubble point of about 200 in. water column or more.

50. The filter element of claim 49, wherein said aramid fiber sheet has a ratio of 1500 cc/min bubble point to first bubble point of about 2 or less.

51. The filter element of claim 50, wherein said aramid fiber sheet has a ratio of 1500 cc/min bubble point to first bubble point of about 1.6 or less.

52. The filter element of claim 46, wherein said aramid fiber sheet has a thickness of about 20 mils or less.

53. The filter element of claim 52, wherein said aramid fiber sheet has a thickness of about 10 mils or less.

54. The filter element of claim 52, wherein said aramid fiber sheet has a sheet weight of about 5 g/ft$^2$ or less.

55. The filter element of claim 54, wherein said aramid fiber sheet has a sheet weight of about 4 g/ft$^2$ or less.

56. The filter element of claim 55, wherein said aramid fiber sheet has a sheet weight of about 2 g/ft$^2$ or less.

57. The filter element of claim 46, wherein said aramid fiber sheet has an air flow resistance of about 100 in. water column or less.

58. The filter element of claim 46, wherein said aramid fiber sheet has no added binder resin.

59. A filter element comprising an aramid fiber sheet having a titer reduction of about $10^5$ or more against *Pseudomonas diminuta*.

60. The filter element of claim 59, wherein said aramid fiber sheet has a titer reduction of about $10^8$ or more against *Pseudomonas diminuta*.

61. The filter element of claim 60, wherein said aramid fiber sheet has a titer reduction of about $10^{10}$ or more against *Pseudomonas diminuta*.

62. The filter element of claim 59, wherein said aramid fiber sheet has a thickness of about 20 mils or less.

63. The filter element of claim 62, wherein said aramid fiber sheet has a thickness of about 10 mils or less.

64. The filter element of claim 62, wherein said aramid fiber sheet has a sheet weight of about 5 g/ft$^2$ or less.

65. The filter element of claim 63, wherein said aramid fiber sheet has a sheet weight of about 4 g/ft$^2$ or less.

66. The filter element of claim 64, wherein said aramid fiber sheet has a sheet weight of about 2 g/ft$^2$ or less.

67. The filter element of claim 59, wherein said aramid fiber sheet has an air flow resistance of about 100 in. water column or less.

68. The filter element of claim 59, wherein said aramid fiber sheet has no added binder resin.

* * * * *